United States Patent [19]
Ward

[11] 3,793,182
[45] Feb. 19, 1974

[54] HYDROCRACKING PROCESS FOR BENZCORONENE-CONTAMINATED FEEDSTOCKS

[75] Inventor: John W. Ward, Yorba Linda, Calif.

[73] Assignee: Union Oil Company of California, Los Angeles, Calif.

[22] Filed: Jan. 30, 1973

[21] Appl. No.: 328,102

Related U.S. Application Data

[63] Continuation-in-part of Ser. No. 241,434, April 5, 1972, abandoned.

[52] U.S. Cl............... 208/111, 208/48 R, 208/59, 252/455 Z
[51] Int. Cl..... C10g 9/16, C10g 13/02, C01b 33/28
[58] Field of Search.......................... 208/111, 59, 48

[56] References Cited
UNITED STATES PATENTS

| | | | |
|---|---|---|---|
| 3,354,077 | 11/1967 | Hansford | 208/111 |
| 3,505,208 | 4/1970 | Vaell | 208/111 |
| 3,554,898 | 1/1971 | Wood et al. | 208/59 |
| 3,715,303 | 2/1973 | Wennerberg et al. | 208/112 |
| 3,725,244 | 4/1973 | Schutt | 208/59 |
| 3,726,787 | 4/1973 | Frazier et al. | 208/59 |

Primary Examiner—Delbert E. Gantz
Assistant Examiner—G. E. Schmitkons
Attorney, Agent, or Firm—Milton W. Lee

[57] ABSTRACT

Mineral oil feedstocks which contain dissolved benzcoronenes are subjected to hydrocracking over certain catalysts based on a steam treated, metal-cation-deficient Y zeolite while maintaining a sufficient recycle of unconverted oil to bring about, in systems using non-steam-treated Y zeolite catalysts, a substantial buildup and eventual precipitation of benzcoronenes in cooler parts of the systems such as heat exchange surfaces. According to the invention, this buildup and precipitation is prevented by virtue of the higher activity of the steam-treated Y zeolite catalysts for conversion of benzcoronenes, as compared to the more conventional non-steam-treated Y zeolite catalysts.

18 Claims, No Drawings

HYDROCRACKING PROCESS FOR BENZCORONENE-CONTAMINATED FEEDSTOCKS

RELATED APPLICATION

This application is a continuation-in-part of copending application Ser. No. 241,434 filed Apr. 5, 1972 and now abandoned.

BACKGROUND AND SUMMARY OF INVENTION

The catalytic hydrocracking of mineral oil feedstocks using Group VIII metal promoted Y zeolite catalysts has in recent years become an established commercial process. This process offers substantial advantages over older hydrocracking processes in respect to catalyst life, liquid yields, reduced dry gas make, and lower operating temperatures and pressures. A difficulty was encountered however in respect to the use of such catalysts for hydrocracking feedstocks containing dissolved benzcoronenes, and where a substantially total recycle of unconverted oil was maintained. These benzcoronene contaminants are not known to be native constituents of crude oils, or any of the virgin distillates therefrom. Neither have they been detected in the unconverted oils from conventional catalytic cracking, coking, thermal cracking, or the like. They are soluble in hydrocarbon oils only to the extent of a few parts per million, up to perhaps about 100 parts per million for the more soluble species. The available evidence indicates that these benzcoronenes find their way into refinery streams via synthesis in high temperature hydroconversions such as reforming, or catalytic hydrofining at temperatures above about 700°F. As is well known, hydrocracking feedstocks are often subjected to catalytic hydrofining to reduce the sulfur and nitrogen levels to values which do not bring about undue deactivation rates of the hydrocracking catalyst. It is mainly in respect to feedstocks which have been prehydrofined at relatively high temperatures that problems involving benzcoronenes have been encountered in Y zeolite hydrocracking processes.

The main problem is not, as might have been supposed, the tendency of these benzcoronenes to cause coking and deactivation of the catalyst; the relatively low temperatures and high hydrogen pressures employed tend to prevent further polymerization and/or condensation reactions of such compounds to form coke. Instead, the principal problem which has evolved is peculiar to those processes wherein substantially all of the heavy unconverted product fraction is continuously recycled in the process. Conventional Y zeolite catalysts apparently do not hydrogenate benzcoronenes at a rate sufficient to prevent their buildup in the recycle system. Due to their low solubility in the oil, when the concentration of such compounds builds up to a level of about 50–100 parts per million, they begin to "plate out" in cooler portions of the system, particularly heat exchange surfaces, transfer lines, valves and the like, resulting in plugging problems and reduced heat exchange efficiency. Conventionally, this problem is solved by bleeding a portion of the recycle oil from the system, but this is undesirable from several standpoints, including reduced yields of more valuable products such as gasoline.

Another solution to this problem is the subject of U. S. Pat. No. 3,505,208, and involves the addition of ammonia to the hydrocracking zone. For reasons which are not clearly understood, the ammonia appears to bring about an increased rate of conversion of the benzcoronenes to other compounds which are more soluble in the liquid product. However, the use of ammonia presents an additional operational complication, and the liquid product ordinarily requires water washing to remove the ammonia. It would be more desirable from several standpoints to provide a catalyst which itself possessed the inherent activity required for converting the benzcoronenes.

It has now been discovered that this desired intrinsic activity is exhibited by a class of recently developed Y zeolite catalysts in which the zeolite component has been subjected to a high temperature steam treatment while in an ammonium form, a hydrogen form, or a decationized form, or mixtures thereof. The objective of these steam treatments, several of which are disclosed in the prior art, was not to improve the catalytic activity for benzcoronene conversion, but to render the catalysts more resistant to hydrothermal degradation, i.e., loss of surface area and crystallinity upon contact with water or water vapor. For reasons which are not clearly understood, it appears that the steam calcination treatments bring about some physical and/or chemical change in the zeolite base which renders it not only more resistant to hydrothermal degradation, but also renders the combination thereof with a Group VIII metal hydrogenating component more active for the hydrodecomposition of benzcoronenes.

DESCRIPTION OF FEEDSTOCKS

Broadly speaking, any mineral oil feedstock may be employed herein which contains benzcoronenes in amounts sufficient to result in a buildup thereof to levels above their solubility limits in a recycle hydrocracking process utilizing conventional Y zeolite catalysts. In some cases, amounts as low as one weight part per million may be sufficient to result in such undesirable buildup, although in general amounts greater than about 5 parts per million are required. It is noteworthy that coronene itself, either because of greater solubility and/or greater ease of conversion by conventional Y zeolite catalysts, does not appear to be troublesome. The troublesome benzcoronenes are defined herein as any fused-ring polycyclic aromatic hydrocarbon containing a coronene nucleus and fused thereto at least one additional benzo-ring. Examples of such compounds which have been found in solid deposits removed from heat exchangers are as follows:

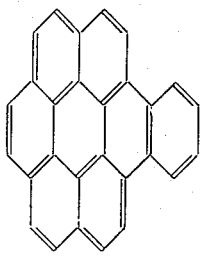

(-42Z)
Benzcoronenes

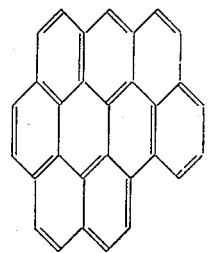

(-44Z)
Naphbenzcoronenes

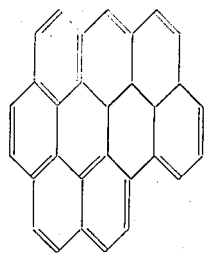
(-46Z)
Dibenzcoronenes

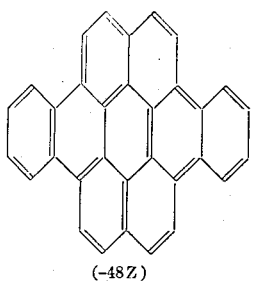
(-48Z)
Dibenzcoronenes

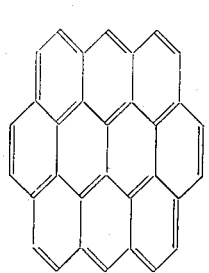
(-50Z)
Ovalenes

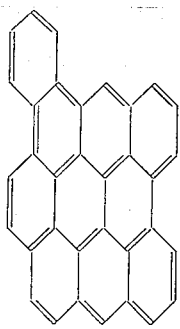
(-52Z)
Tribenzcoronenes

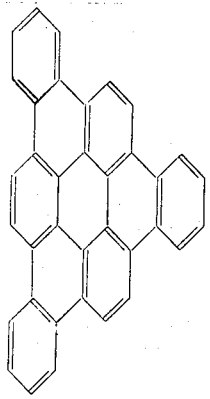
(-54Z)
Tribenzcoronenes

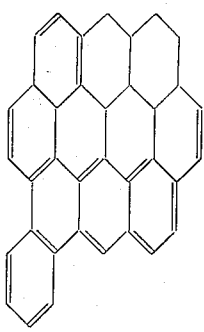
(-56Z)
Benzovalenes

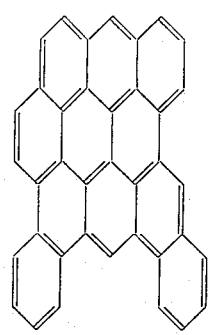
(-58Z)
Tetrabenzcoronenes

It will be apparent that in many instances, the above structural formulae represent merely one isomer of the given generic name. The Z factors noted refer to the hydrogen deficiency of the respective hydrocarbons, from the general formula $C_nH_{2n+z}$.

Although the above compounds are very high boiling materials it is not to be assumed that they are found only in mineral oils of similarly high end-boiling-points (as determined by conventional ASTM methods). Since the limit of solubility of these compounds ranges between about 10 and 100 parts per million, their presence in mineral oils has little or no effect upon end-boiling-points thereof as determined by conventional methods. Hence, it may be found that feedstocks with end-boiling-points as low as about 500°F may contain troublesome amounts of benzcoronenes.

As noted above, benzcoronenes are generally found only in hydrocarbon fractions which have previously been subjected to high-temperature hydrocatalytic conversions. Products from these refining processes hence normally constitute the primary feedstocks to which the present invention is applicable. Typical feedstocks comprise hydrofined gas oils boiling between about 400° and 1,200°F, heavy naphtha reformate polymer fractions boiling between about 400° and 550°F., and the like. Obviously, blends of such fractions with other virgin and/or cracked distillates may also be utilized.

PROCESS DESCRIPTION

In broad aspect, the invention simply involves passing the desired feedstock along with added hydrogen through a hydrocracking unit containing a steam-calcined Y zeolite catalyst as hereinafter described, cooling and condensing the resulting product, fractionating it to recover the desired low boiling product, e.g., gasoline and/or jet fuel, and finally recycling sufficient unconverted oil to bring about, under normal conditions utilizing a conventional Y zeolite catalyst, a buildup of benzcoronenes to levels exceeding their solubility in the liquid product condensate. Thus, the invention is not limited to a total recycle of unconverted oil, although one of the most advantageous aspects of the invention is that it does permit total recycle. Operative hydrocracking conditions are as follows:

HYDROCRACKING CONDITIONS

| | Broad Range | Preferred Range |
|---|---|---|
| Temperature, °F. | 450–850 | 500–750 |
| Pressure, psig | 500–4,000 | 600–3,000 |
| LHSV | 0.4–20 | 1–10 |
| H₂/Oil Ratio, MSCF/B | 3–15 | 4–10 |

The above conditions, principally temperature and space velocity, are suitably adjusted and correlated in conventional manner so as to achieve about 10–80, preferably about 20–70 volume-percent conversion per pass to desired product. If the major desired product is a relatively saturated middle distillate fraction such as turbine fuel, it is preferred to carry out the hydrocracking substantially in the absence of hydrogen sulfide (less than about 50 ppm of sulfur based on feed) in order to obtain a more saturated product. For this purpose, low operating temperatures in the range of about 450° – 650°F. are normally preferred. Where gasoline is the major desired product, it is normally preferred to operate at relatively high temperatures in the range of about 650° – 850°F., in the presence of at least about 50 ppm of hydrogen sulfide in order to obtain a more aromatic high-octane product.

DESCRIPTION OF CATALYSTS

Effective catalysts for use herein comprise in general any crystalline, steam-calcined, metal-cation-deficient Y zeolite cracking base upon which is deposited a minor proportion of a Group VIII metal hydrogenating component. The term "metal-cation-deficient" refers to Y zeolites in which at least about 50 percent, and preferably at least about 80 percent of the original ion exchange sites have been decationized and/or satisfied by hydrogen ions. These metal-cation-deficient zeolites are normally produced by ion exchanging the original sodium Y zeolite with ammonium salt solutions until the sodium content thereof has been reduced to below about 3 weight-percent, preferably below one percent, of $Na_2O$. To produce a conventional metal-cation-deficient Y zeolite, the resulting ammonium zeolite is calcined under substantially dry conditions at temperatures of about 600° – 1,800°F., preferably about 800° – 1,650°F., to decompose the zeolitic ammonium ions and produce the desired hydrogen and/or decationized zeolite. When intimately composited with a hydrogenating metal such as palladium, this material forms a highly active hydrocracking catalyst, but is not hydrothermally stable and does not display the desired intrinsic activity for converting benzcoronenes.

To achieve the desired activity for converting benzcoronenes, as well as hydrothermal stability, the calcination step referred to above is carried out at temperatures of about 950° – 1,800°F., preferably about 1,100° – 1,650°F., and in the presence of at least about 0.2 psi of water vapor, preferably about 5 to 15 psi. It is not essential that steam be present during the entire calcination; it is entirely feasible to carry out a dry calcination to effect deammoniation and formation of a conventional metal-cation-deficient zeolite, and thereafter carry out the steam calcination to give the desired hydrothermal stability and activity for benzcoronene conversion. Any suitable procedure may be utilized for maintaining the necessary water vapor partial pressure in contact with the zeolite during at least an effective portion of the calcination treatment. In one modification, the wet zeolite from the exchange step can merely be heated in a covered container so as to retain the water vapor generated therefrom. Alternatively the zeolite can be introduced into a batch or continuous rotary furnace, or a static bed calcination zone, into which preheated steam or humidified air is introduced. The duration of steam treatment is at least about 0.5 minutes, preferably about 30 minutes to about 4 hours. Suitable steam treatments are described more in detail in U. S. Pat. No. 3,354,077.

One effect of the steam calcination is a reduction in the unit cell size of the zeolite. This parameter can be used as a measure of the required steaming severity for the present purposes. The factors, time, temperature and water vapor partial pressure should be correlated so as to effect at least about 0.2 percent, and preferably at least about 0.4 percent, reduction in unit cell size, from the cell size of the original sodium Y zeolite.

If desired, the steam stabilized zeolite produced as above described can be subjected to a second ammonium ion exchange step to further reduce the sodium content thereof, and the resulting product then again calcined, preferably under dry conditions, to effect deammoniation thereof. The second calcination is conducted at temperatures between about 750° and 1,300°F., preferably about 800° – 1,000°F. The product resulting from such a double-exchange, double-calcination procedure is not only hydrothermally stable, but is stable in the presence of ammonia and water vapor.

A herein preferred modification of the stabilized zeolite described above is prepared by carrying out the final calcination after mixing the zeolite with a finely divided, hydrous metal oxide such as alumina, as described more particularly in my co-pending application Ser. No. 191,123, filed Oct. 11, 1971. The resulting composition is also hydrothermally stable and stable in the presence of ammonia and water vapor. This preferred zeolite is prepared as follows:

The initial sodium Y zeolite starting material, containing about 10–14 weight-percent of sodium as $Na_2O$, is first digested in conventional manner with an aqueous solution of a suitable ammonium salt such as the chloride, nitrate, sulfate, carbonate, acetate, etc., to replace at least about 20 percent but not more than about 95 percent, of the original sodium ions with ammonium ions. The sodium content should be reduced to about 0.6 – 5 percent, preferably about 1–4 percent by weight, as $Na_2O$. To reduce the sodium level to this value, it may be desirable to employ two or more stages of exchange treatments. If it is desired to remove less than about 50 percent of the sodium in this step, dilute acids, e.g., 0.01N $HNO_3$, may be used instead of ammonium salts. The initial steam calcination is then carried out as described above.

The resultant steam-calcined zeolite is then reexchanged with ammonium salt solution under sufficiently severe conditions to reduce the sodium content to less than about 3 weight-percent, usually less than one percent, and preferably less than about 0.6 weight-percent, as $Na_2O$. It should be realized that this second exchange treatment does not introduce any appreciable amount of ammonium ions into the exchange sites which were converted to hydrogen ion and/or decationized sites in the first calcination step; nearly all of the ammonium ions which go into the zeolite at this point do so by replacing remaining sodium ions. Since a substantial ammonium zeolite moiety is desired in the final calcination step for conversion to active exchange sites during the final calcination, it will be apparent that sufficient sodium should be initially present at the second exchange step to permit a substantial portion of the ion exchange capacity to become satisfied by ammonium ions. Accordingly, the zeolite subjected to the second ion exchange step should contain sufficient sodium remaining from the first exchange step to provide in the double-exchanged zeolite an amount of ammonium ion corresponding to at least about 5 relative percent, preferably 10–20 percent, of the original ion exchange capacity of the zeolite.

Prior to the final calcination step, preferably following the second exchange step, the zeolite component is intimately admixed with a finely divided, hydrous, refractory oxide of a difficultly reducible metal. The term "hydrous" is used to designate oxides having structural surface hydroxyl groups detectable in infra red analysis. The preferred oxides are alumina, silica, magnesia, beryllia, zirconia, titania, thoria, chromia, and combinations thereof such as silica-alumina, silica-magnesia, and the like. Naturally occurring clays comprising silica and alumina may also be utilized, preferably after acid treatment. The resulting mixtures may contain between about 0.5 and 98 weight-percent of zeolite, preferably at least about 2 weight-percent, and generally about 5 to about 80 weight-percent, based on the combined dry weight of the zeolite and the metal oxide. The metal oxide can be combined with the zeolite as a hydrous sol or gel, as an anhydrous activated gel, a spray dried powder or a calcined powder. In one modification a sol or solution of the metal oxide precursor such as an alkali metal silicate or aluminate can be precipitated to form a gel in the presence of the zeolite.

When less hydrous forms of the metal oxide are combined with the zeolite, essentially any method of effecting intimate admixture of the components may be utilized. One such method is mechanical admixture, e.g., mulling, which involves admixing the zeolite in the form of a powder with the slightly hydrous, finely divided form of the metal oxide. Minor amounts of water, with or without an acidic peptizing agent such as a strong mineral acid, are usually added to facilitate admixture.

After admixing the hydrous oxide with the zeolite component, it is normally preferable at this point to form the mixture into the shape desired for the final catalyst. Conventional tableting, prilling, or extruding procedures may be utilized to produce tablets, prills or extrudate pellets having a diameter of about one thirty-second inch to three-eighths inch. Other conventional pelleting aids may be added such as lubricants, binders, diluents, etc.

The pelleted zeolite-metal oxide composition is then subjected to a second calcining at temperatures between about 750° and 1,300°F., preferably about 800° – 1,000°F. It is preferred to maintain a relatively anhydrous environment during this second calcination. If there is a substantial water vapor partial pressure during this step, the final catalyst is usually less active than those produced in the substantial absence of water vapor. Accordingly, this calcination is preferably conducted in the presence of less than 2, and preferably less than about 1, psi of water vapor. The calcination may be regarded as complete when substantially all water and ammonia have been expelled from the catalyst, which, depending on the temperature employed, may range between about 10 minutes and 12 hours or more.

The necessary metal hydrogenation component may be distributed selectively on the zeolite component of the catalyst, or on the metal oxide component. Alternatively it may be distributed more or less equally on both components. Effective hydrogenation components comprise the Group VIB and/or Group VIII metals and their oxides and/or sulfides, with or without other metals such as rhenium. Operative proportions (based on free metal) may range between about 0.1 percent and 30 percent by weight, depending upon the type of metal or metals selected, and the desired activity. In the case of the Group VIII noble metals, amounts in the range of 0.1 to about 2 percent will normally be employed; the iron group metals, iron, cobalt and nickel, are normally utilized in proportions of about 1–10 weight-percent; the Group VIB metals will normally be utilized in proportions of about 3–20 weight-percent. Preferred hydrogenating metals are palladium, platinum, nickel, cobalt, tungsten and molybdenum. Particularly preferred are palladium, or combinations of nickel and/or cobalt with molybdenum and/or tungsten.

The hydrogenating component may be added to the catalyst at any desired stage in its manufacture. Preferred methods include impregnation and/or ion-exchange of soluble metal salts into the powdered zeolite after the second ammonium ion exchange, or into the catalyst pellets prior to the final calcination step. Other methods include mixing of soluble or insoluble compounds of the desired metal or metals with the powdered zeolite-hydrous metal oxide mixture prior to extruding or pelleting.

The following examples are cited to demonstrate the superior benzcoronene conversion activity of the catalysts of this invention, but are not to be construed as limiting in scope:

EXAMPLE I

A palladium-zeolite-alumina catalyst ("A") of this invention was prepared as follows: Sodium Y zeolite having a $SiO_2/Al_2O_3$ mole-ratio of about 4.8 was repeatedly ion exchanged with excess ammonium sulfate solution until the sodium content thereof was reduced to 1.7 weight-percent of $Na_2O$. The zeolite was then recovered by filtration and activated by steaming at 700°C for one hour in contact with about 15 psi of water vapor. The steaming reduced the unit cell size of the zeolite by about 0.7 percent. Reexchange with ammonium sulfate further reduced the sodium content to 0.2 weight-percent $Na_2O$. This material was then subjected to ion exchange with an aqueous ammoniacal solution of palladium tetramminochloride, $Pd(NH_3)_4Cl$, in proportions sufficient to introduce 0.65 weight-percent palladium metal into the zeolite (corresponding to 0.5 weight-percent palladium in the final composition).

An extrudable paste was then prepared by mixing sufficient proportions of the zeolite, alumina and water to provide a finished product containing 80 weight-percent zeolite and 20 weight-percent alumina on a dry weight basis. The paste was then extruded and calcined in air by gradually increasing the temperature of the extrudate to 930°F. over a five hour period, and holding at that temperature for an additional one hour. Throughout the final calcining, dry air containing less than 0.5 psi water vapor was passed over the zeolite supported on a porous grid in the calcination furnace.

EXAMPLE II

The catalyst of Example I was tested for hydrocracking activity in comparison with a more conventional Y zeolite catalyst ("B") containing 0.5% Pd. The zeolite base for this catalyst was prepared by exchanging the original sodium Y zeolite with an ammonium salt solution to reduce the sodium content to about 1 percent $Na_2O$, followed by back-exchange with magnesium sulfate solution to introduce stabilizing zeolitic magnesium ions equivalent to about 3 weight-percent MgO. The product was then slurried with water and about 20 weight-percent (dry basis) of alumina gel, and the palladium was added as described in Example I. The wet filter cake was then dried, pelleted and dry-calcined substantially as described for the second calcination in Example I.

Catalysts A and B were then tested for hydrocracking activity in an "integral" hydrofining-hydrocracking system in which the raw feed was first hydrofined in conventional manner to reduce the organic nitrogen content to about 1 ppm, and the entire hydrofiner effluent was then passed through the respective hydrocracking catalyst bed A or B, with temperature controlled to give 50 percent conversion per pass to $C_4$-400°F gasoline. Unconverted oil was recycled to the hydrocracking catalyst bed. In each case the hydrocracking space velocity was 2.05 and the pressure was 1,550 psig. The principal results were as follows:

Table 1

| Catalyst | A | B |
|---|---|---|
| Time on stream, Hrs. | 247 | 169 |
| Coronene and Benzcoronene content, ppm | | |
| In hydrofiner effluent | 1.7 | 1.8 |
| In hydrocracker recycle oil | 3.5 | 9.0 |

Upon repeating these runs at 775 psig and 1.0 space velocity, the results were as follows:

Table 2

| Catalyst | A | B |
|---|---|---|
| Time on stream, Hrs. | 197 | 176 |
| Coronene and Benzcoronene content, ppm | | |
| In hydrofiner effluent | 12.5 | 14 |
| In hydrocracker recycle oil | 3.0 | 14 |

It is apparent that catalyst A is much more active than catalyst B for converting benzcoronenes. The results with catalyst B would be even less favorable if ammonia from the hydrofiner had not been present in the hydrocracking zone.

(The raw feed employed in this example boiled between 400° and 850°F., had a gravity of 23.8° API, and contained 1.3 weight-percent sulfur and 0.22 weight-percent nitrogen.)

EXAMPLE III

This example demonstrates that the catalysts of this invention do not require the presence of ammonia for effective benzcoronene conversion, while catalyst B of Example II compares even less favorably in the absence of ammonia.

In this example, the feed of Example II was integrally hydrofined and hydrocracked as described in Example II, but instead of recycling unconverted oil from the hydrocracking zone back to that zone, it was subjected to separate recycle hydrocracking in an ammonia-free hydrocracking zone containing the same catalyst as the first hydrocracking zone. In one run, both hydrocracking zones contained catalyst A, while in the other, both contained a catalyst substantially identical to catalyst B. Temperatures in the first zone were controlled to give about 40 volume percent conversion per pass to gasoline, and in the second zone to give about 60 percent conversion per pass. In each run, pressures, space velocities and hydrogen ratios were essentially the same in the respective contacting zones. The significant results were as follows:

Table 3

| Days on stream | | 15 | 25 | 35 | 45 | 55 | 59 |
|---|---|---|---|---|---|---|---|
| | Catalyst | | | | | | |
| Effluent from first hydrocracking zone | A | 6 | 6 | 6 | 7 | 7 | 7 |
| | B | 19 | 23 | 18 | — | — | — |
| Feed to second hydrocracking zone (includes recycle oil from second zone | A | 4 | 5 | 6 | 7 | 8 | 8 |
| | B | 35 | 52 | 64 | — | — | — |

It is thus apparent that catalyst A performed much better in both hydrocracking zones than did catalyst B; but the difference is much more dramatic in the ammonia-free second zone to which unconverted oil was being recycled.

It is not intended that the invention should be limited to the details described above. The following claims and obvious equivalents thereof are intended to define the true scope of the invention.

I claim:

1. A process for hydrocracking a mineral oil feedstock which has been previously hydrofined at temperatures above about 700°F. which comprises contacting said feedstock plus added hydrogen and under hydrocracking conditions with a catalyst comprising a Group VIII metal hydrogenating component supported on a metal-cation-deficient Y zeolite cracking base containing less than about 3 weight-percent $Na_2O$, and which has been previously calcined while in its metal-cation-deficient and/or precursor ammonium form, in the presence of sufficient water vapor to reduce its unit cell size at least about 0.2 percent, recovering from said contacting a desired low-boiling product fraction, and recycling unconverted oil to said contacting.

2. A process as defined in claim 1 wherein substantially all of said unconverted oil is recycled.

3. A process for hydrocracking a mineral oil feedstock containing dissolved benzcoronenes which comprises contacting said feedstock plus added hydrogen and under hydrocracking conditions with a catalyst comprising a Group VIII metal hydrogenating component supported on a metal-cation-deficient Y zeolite cracking base containing less than about 3 weight-percent $Na_2O$, and which has been previously calcined while in its metal-cation-deficient and/or precursor ammonium form, in the presence of sufficient water vapor to reduce its unit cell size at least about 0.2 percent, recovering from said contacting a desired low-boiling product fraction, and recycling unconverted oil to said contacting.

4. A process as defined in claim 3 wherein said calcining is carried out at temperatures of about 1,110° – 1,650°F. in the presence of about 5–15 psi of water vapor.

5. A process as defined in claim 3 wherein the severity of said calcining is controlled so as to reduce the unit cell size and said Y zeolite cracking base by at least about 0.4 percent.

6. A process as defined in claim 3 wherein said Group VIII metal is palladium and/or platinum.

7. A process as defined in claim 3 wherein said feedstock contains at least about 5 ppm of benzcoronenes, and wherein substantially all of said unconverted oil is recycled.

8. A process as defined in claim 3 wherein said Y zeolite cracking base is at least about 80 percent metal-cation-deficient and contains less than about 1 percent by weight of sodium as $Na_2O$.

9. A process as defined in claim 3 wherein said Group VIII metal is palladium and/or platinum, said feedstock contains at least about 5 ppm benzcoronenes, said Y zeolite cracking base is at least about 80 percent metal-cation-deficient and contains less than about one percent by weight of sodium as $Na_2O$, and said calcining is controlled so as to reduce the unit cell size of said cracking base by at least about 0.4 percent.

10. A process for hydrocracking a mineral oil feedstock containing dissolved benzcoronenes which comprises contacting said feedstock plus added hydrogen and under hydrocracking conditions with a catalyst comprising a Group VIII metal hydrogenating component supported on a metal-cation-deficient Y zeolite cracking base, recovering from said contacting a desired low-boiling product fraction, and recycling unconverted oil to said contacting, said Y zeolite cracking base having been prepared by:
  1. ion-exchanging a sodium Y zeolite with ammonium salt solution to reduce the sodium content thereof to between about 0.6 percent and 5 percent by weight as $Na_2O$;
  2. calcining the resulting ammonium Y zeolite in the presence of sufficient water vapor to reduce the unit cell size of the zeolite by at least about 0.2 percent;
  3. subjecting the calcined zeolite to a second ion-exchange with ammonium salt solution to reduce the sodium content thereof to less than about 3 weight-percent as $Na_2O$; and
  4. calcining the twice-exchanged zeolite under substantially dry conditions to effect deammoniation thereof.

11. A process as defined in claim 10 wherein step (4) is carried out after intimately admixing the zeolite with a finely divided, hydrous oxide selected from the class consisting of alumina, silica, magnesia, beryllia, zirconia, titania, thoria, chromia, clays and combinations thereof.

12. A process as defined in claim 11 wherein said hydrous oxide comprises alumina.

13. A process as defined in claim 12 wherein step (2) is carried out at temperatures of about 1,100° – 1,650°F. in the presence of about 5–15 psi of water vapor.

14. A process as defined in claim 12 wherein the severity of said calcining in step (2) is controlled so as to reduce the unit cell size of said Y zeolite cracking base by at least about 0.4 percent.

15. A process as defined in claim 12 wherein said Group VIII metal is palladium and/or platinum.

16. A process as defined in claim 12 wherein said feedstock contains at least about 5 ppm of benzcoronenes, and wherein substantially all of said unconverted oil is recycled.

17. A process as defined in claim 12 wherein said Y zeolite cracking base is at least about 80 percent metal-cation-deficient and contains less than about one percent by weight of sodium as $Na_2O$.

18. A process as defined in claim 12 wherein said Group VIII metal is palladium and/or platinum, said feedstock contains at least about 5 ppm of benzcoronenes, said Y zeolite cracking base is at least about 80 percent metal-cation-deficient and contains less than about one percent by weight of sodium as $Na_2O$, and said calcining in step (2) is controlled so as to reduce the unit cell size of said cracking base by at least about 0.4 percent.

* * * * *

UNITED STATES PATENT OFFICE
CERTIFICATE OF CORRECTION

Patent No. 3,793,182   Dated February 19, 1974

Inventor(s) John W. Ward

It is certified that error appears in the above-identified patent and that said Letters Patent are hereby corrected as shown below:

Column 10, line 62 (claim 4) "1,110°" should be --1,100°--.
Column 10, line 67 (claim 5) "and" should be --of--.

Signed and sealed this 11th day of June 1974.

(SEAL)
Attest:

EDWARD M. FLETCHER, JR.
Attesting Officer

C. MARSHALL DANN
Commissioner of Patents